March 14, 1967 C. A. G. LEMAY 3,309,674

PATTERN RECOGNITION DEVICES

Filed April 11, 1963 4 Sheets-Sheet 3

United States Patent Office 3,309,674
Patented Mar. 14, 1967

3,309,674
PATTERN RECOGNITION DEVICES

Christopher Archibald Gordon Lemay, Isleworth, England, assignor to Electric & Musical Industries Limited, Hayes, England, a British company Filed Apr. 11, 1963, Ser. No. 272,249
Claims priority, application Great Britain, Apr. 13, 1962, 14,293/62
14 Claims. (Cl. 340—172.5)

Figure 1:
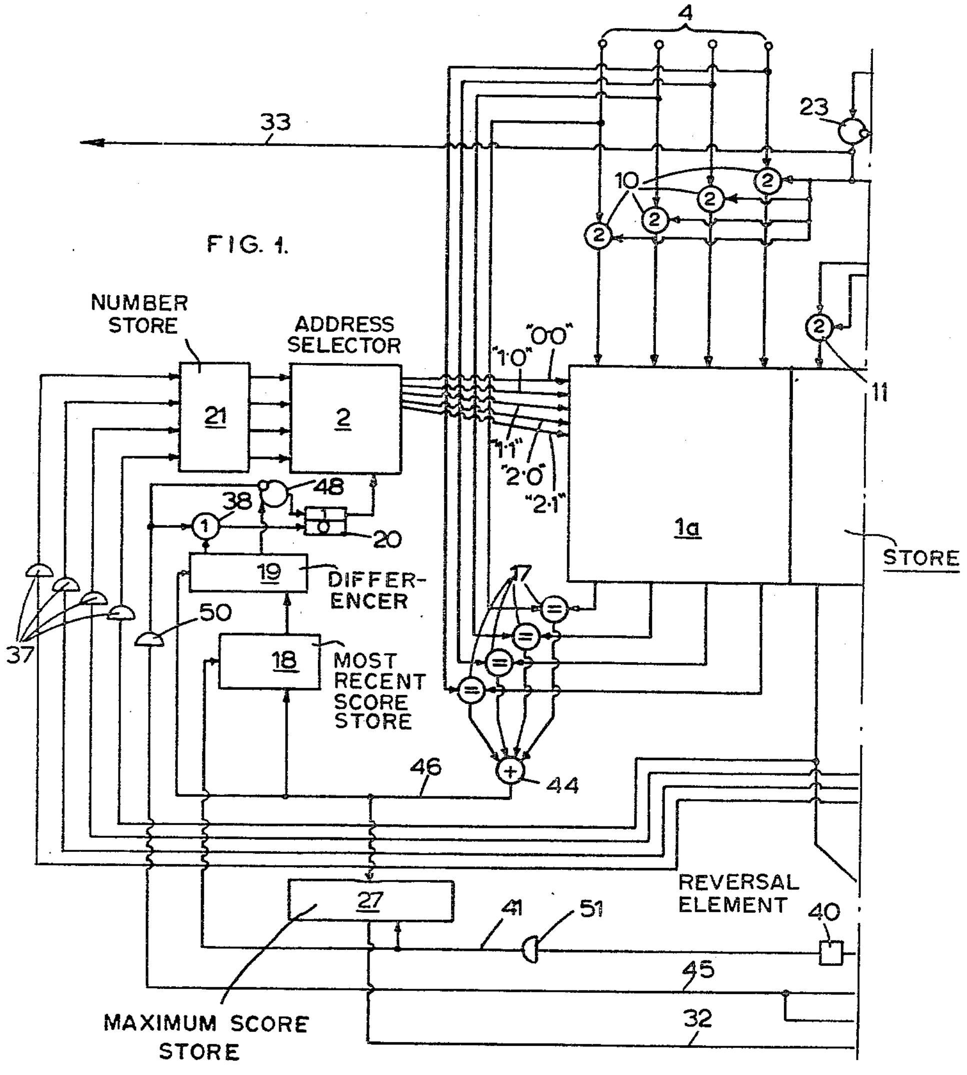
Figure 1:
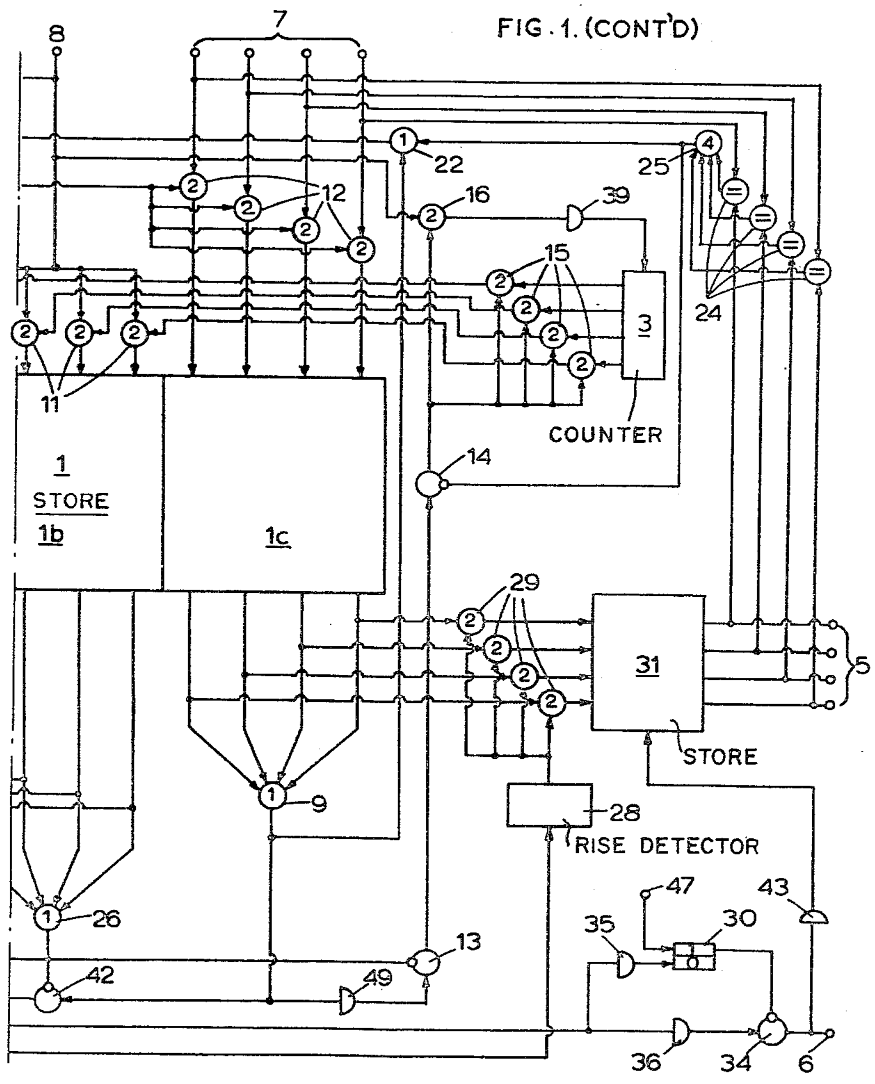

The present invention relates to data sorting devices and has particular, but not exclusive reference to devices which may be conditioned or "taught" to associate certain information in the form of input signal patterns with predetermined responses, and thereafter to recognise such signal patterns, and to produce the appropriate response.

Such devices have been proposed, but generally problems arise from the time required for recognition to take place. Inevitably, a compromise has to be reached between speed and reliability. Usually, the solution reached involves the use of only a small amount of the input information available in determining the most appropriate response, and this frequently leads to unreliability.

It is one object of the present invention to provide a data sorting device in which the above mentioned compromise is more effectively met.

In accordance with the present invention there is provided a data sorting device comprising a store, first input means for a multi-element information signal, second input means for an associated response signal, means for selecting an address in said store, said selecting means including means for selecting a group of addresses and further means for selecting an address within the groups, said store being divided into three parts, a first part for multi-element information signals, a second part for associated response signals and a third part for selection signals, means for transferring signals from said third part of said store to said selecting means to select a group of addresses, means for comparing a multi-element information signal derived from the first part of said store with an input multi-element information signal and for controlling the further means for selecting the address within the groups whereby an input multi-element information signal is compared with a sequence of stored multi-element information signals.

According to a preferred form of the present invention there is provided a data sorting device comprising:

(1) A store including a plurality of groups of storage portions, (2) First input means for a multi-element information signal, (3) Second input means for an associated response signal, (4) Means for recording a first information signal and a first associated response signal in an indicated storage position in said store, (5) Group selecting means for selecting a group of position in said store in one of which a subsequent information signal and its associated response signal may be recorded, (6) Means for storing an indication of such group in association with said first signal and for adjusting said group selecting means to select the next group of positions, (7) Comparison means for determining the number of correspondences between the elements of said first information signal and the respective elements of a further information signal subsequently applied to said first input means, (8) Means responsive to the number of correspondences for selecting one of the group of positions indicated in association with said first information signal, (9) Means responsive to the presence of an information signal and its associated response in the selected position of the group for initiating a further comparison by said comparison means between the information signal in the selected position of the group and said further information signal, and

(10) Means responsive to an absence of an information signal and its associated response in said indicated position for (a) Recording in the indicated position said further information signal, (b) For storing in association with said further information signal an indication of the group of signals selected by said group selecting means and (c) For adjusting the group selecting means to select the next group of positions.

In accordance with another aspect of the invention there is provided a data sorting or recognition means comprising input means for an information signal to be sorted or recognised, a store for recording information signals, means for recording with each information signal in the store, a group selecting signal indicating a group of store positions and comparison means for selecting one of a group of positions indicated by a group selecting signal, said comparison means being arranged to compare a signal applied to said input means and the information signal with which said group selecting signal is recorded and to make the selection in dependence upon the degree of comparison.

Figure 2:
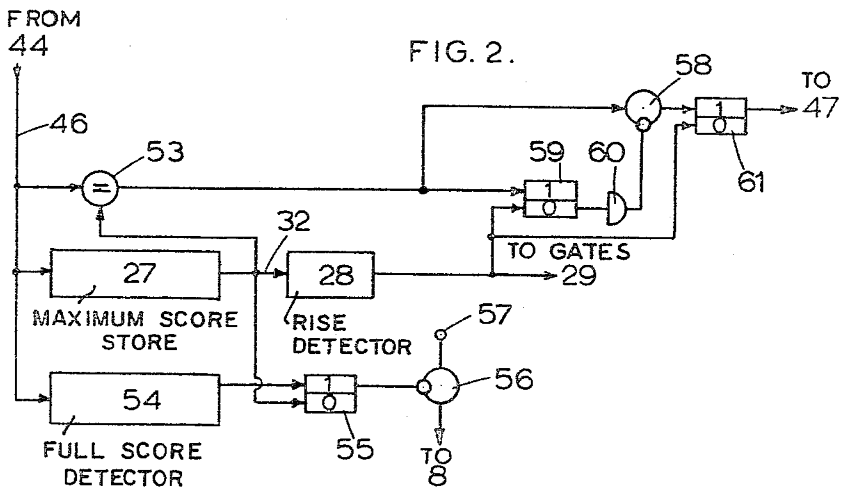
Figure 3:
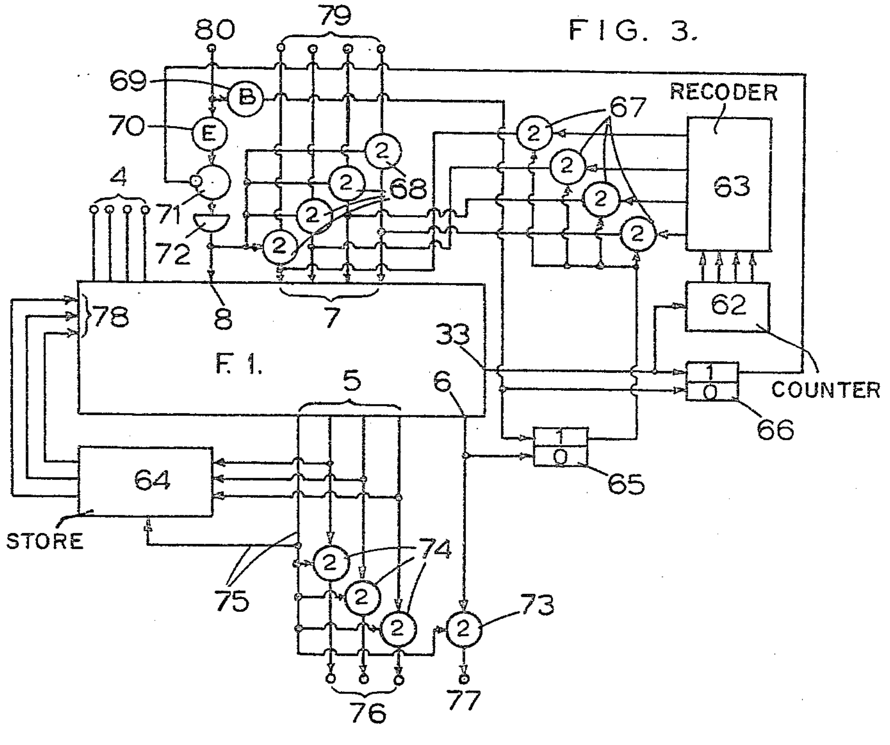
Figure 4:
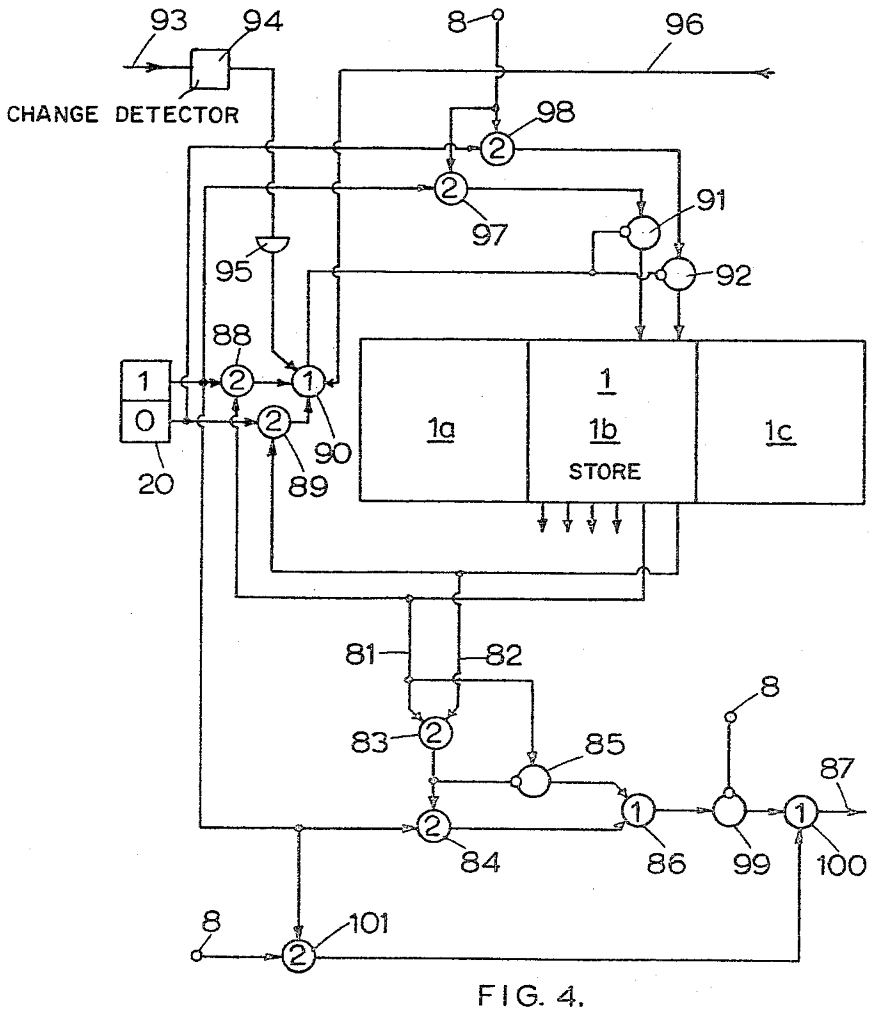

In order that the present invention may be clearly understood and more readily carried into effect, it will now be described with reference to the accompanying drawings, of which:

FIGURES 1*a* and 1*b* together show the basic arrangement of a data sorting device in accordance with one embodiment of the present invention, FIGURE 2 shows a modification to a part of the device shown in FIGURES 1*a* and 1*b*, FIGURE 3 shows one method of utilising a device in accordance with the present invention, and FIGURE 4 shows a further modification of the device illustrated in FIGURES 1*a* and 1*b*.

FIGURE 1*a* and 1*b* of the drawings illustrates the general arrangement of a data sorting device which may be taught to associate a number of different signal patterns each of which is applied in parallel to the input terminals 4 together with an associated output code applied in parallel to input terminals 7. Only four input terminals 4 and four input terminals 7 are shown in the drawings. In practice the number of terminals 4 and 7 is much greater and in this example the signals applied to both sets of terminals are binary signals one binary place corresponding to each terminal. In general of course the signal applied to the terminals 7 has fewer bits than that applied to the terminals 4. After the teaching process the device is able to associate a pattern which it has learned with an output code and produce that code in parallel on output terminals 5. Whilst the device is being taught an instruction to learn signal is applied to terminal 8. On recognition a signal to accept an output is derived from terminal 6.

The general construction of the device comprises a binary signal store 1 which is divided into three sections 1*a*, 1*b* and 1*c*, each address wire being common to all three sections. This store may be of any known form, but in this example is a store which provides a continuous output from the particular address selected, the output being produced while the input is being recorded, and continuing to be produced so long as the recorded address is selected. Thus, the store is a matrix store of the thin magnetic film type producing a continuous output such as is disclosed in co-pending patent application No. 85,116. The store as described in said application is similar to the magnetic film stores such as are now well known, but interrogation is achieved by applying an oscillation or superimposed oscillations to the appropriate address wires. The oscillation or oscillations so applied produce a corresponding oscillatory output from the sense wires of the store, without permanently changing the magnetisation of the respective elements. Phase sensitive detection of the output oscillation from each sense wire produces the required output signal indicative of the stored digit value. If the store does not produce a continuous output from the selected address, then means for interrogating it at the appropriate times must be included. Such means are not an intrinsic part of the present invention, and are, moreover, well known in the art, so in the interests of simplicity the store is arranged to be able to produce a continuous output. If, however, a store which operates upon the principle of destructive readout and subsequent re-writing, is utilised, it must be remembered that in practice the long term memory of the device can be expected to suffer due to erroneous re-writing.

Referring to FIGURES 1*a* and 1*b*, the input pattern, being in this example of the form of four binary bits, is applied in parallel to the terminals 4. The terminals 4 are connected via four gates of threshold "2" to the writing or so called digit connections of the section 1*a* of the store 1. The output signals from the sense wires of the section 1*a* also in the form of four binary bits in parallel are connected to an input of respective equality gates 17, the other inputs of which are connected directly to the terminals 4. The store 1 is arranged in three sections 1*a*, 1*b* and 1*c* and is such that when an address wire of the store is energised storage elements at the corresponding address in the three sections of the store produce parallel output signals on the sense wires shown emerging from the bottom of the sections 1*a*, 1*b* and 1*c*, such output signals representing the stored information for the duration of the energisation of the address wire. Each section of the store 1*a*, 1*b* and 1*c* has a group of storage elements associated with each address wire. The address wires are energised from an address selector 2 which is arranged to de-code information from the number store 21 in the form of binary bits and a further bit of information from the two-state device 20. The output from 21 is represented as having only four binary bits, but the number of bits is much larger, being sufficient to represent the number of "pairs" of addresses in the store 1. The outputs of the equality gates 17 are applied in parallel to an adder 44 which produces an output signal representing the number of the gates 17 which are producing an output signal. The adder 44 is an analogue summing amplifier of well known form and need only be capable of differential accuracy in any one teaching or recognition process. Its absolute accuracy is not critical. The output of the store 44 is applied to a store 18 and to a store 27, the store 27 being such as to store the largest number applied to it from 44 and to be insensitive to smaller numbers. The store 27 is a peak detector. The number stored in the store 18 is compared with the output of the adder 44 by the differencer 19 which has two output conductors, one which carries a signal indicating that the number from the adder 44 is greater than the number from the store 18 and is applied to the gate 48 and the other indicating that the number from the adder 44 is less than that from the store 18 and is applied to the gate 38. The gates 48 and 38 are applied to the two-state device 20 to set it to the "1" and "0" states respectively. The differencer 19 is an analogue comparison circuit of known construction, and the store 18 may be an analogue store such as described for example in British patent specification No. 761,853.

The input terminals 7 are provided as indicated for receiving binary code information of code groups corresponding to patterns applied to the terminals 4. These code groups are applied only during the learning process. The terminals 7 are connected in parallel via gates 12 of threshold "2" to the inputs of the section 1*c* of the store 1. The outputs of the section 1*c* of the store 1 are connected via individual gates 29 of threshold "2" to the inputs of a store 31 and also directly to inputs of a gate 9 of threshold "1." The store 31 is a conventional binary signal staticiser. The outputs of the store 31 are connected to output terminals 5 and to one input of equality gates 24, the other inputs of which gates are connected to the terminals 7. The outputs of the gates 24 are connected to a gate 25 of threshold "4," the output of which inhibits the passage of signals through the gate 14 and is connected to one input of the gate 22 of threshold "1," the other input of which is connected to the output of the gate 9. The output of the gate 22 is connected to inhibit the gate 23, the input of which is connected to a terminal 8 and the output of which is connected to enable the gates 10 and 12. The output of the gate 23 is also applied to the conductor 33 for reasons which will be explained hereinafter.

During the learning process an instruction to learn signal is applied to the terminal 8 which is connected to the gate 23, as explained above, to one input of the gate 16 of threshold "2" and to one input of each of the gates 11 of threshold "2." The second input of the gates 11 is connected from the outputs of a binary counter 3 via the gates 15. The counter is, for simplicity, represented merely as a four stage counter, but it requires a capacity corresponding to the number of "pairs" of addresses in store 1. The outputs of the gates 11 are applied to the input of the section 1*b* of the store 1. The outputs of the section 1*b* of the store 1 are connected to a gate 26 of threshold "1" and in parallel via delays 37 to the inputs of the number store 21. The output from the gate 26 is connected to inhibit the gates 13 and 42 and via a reversal element 40 and a delay element 51 to reset the stores 18 and 27 to a value equal to half their maxima. Thus when there is no output from the gate 26, an output is produced by the element 40 and this output delayed by 51 resets the stores 27 and 18 as indicated. The output of the gate 9 is connected via the gate 42 and the delay element 50 to an input of the gate 38 and to inhibit the gate 48. The output of the gate 42 is also taken via the delay element 36 to the input of the gate 34 and via the delay element 35 to the two-state device 30 to set it to the "0" state. A terminal 47, to which a signal is applied if the input information applied to the terminals 4 changes during the operation of the device, is connected to the device 30 to set it to the "1" state, the device 30 being connected to the gate 34 to inhibit the passage of signals therethrough if the device 30 is in the "1" state. The output of the gate 34 is connected to a terminal 6 to produce a signal indicating that the output at the terminals 5 is acceptable and also via the delay element 43 to a resetting connection on the store 31 to clear it. The output of the gate 9 is also connected via the delay 49 and the gates 13 and 14 to enable the passage of signals through the gates 15 and 16. The output of the gate 16 is connected via a delay element 39 to the input of the counter 3 so that a signal from the gate 16 increases the count recorded by the counter 3 by one. A rise detector 28 is connected to the store 27 and is arranged to produce an output signal if the analogue number signal stored in the store 27 increases, the output signal of 28 being connected to the gates 29 to enable the passage of signals therethrough. The rise detector is a differentiating circuit with means of known kind to cause it to produce an output only in response to an increase in the input signal.

For convenience, throughout the following description, the addresses of the store 1 are referred to as a number pair such as "0,0," "1,0," "1,1," "2,0," "2,1," etc., the first number indicating the number from the store 21 and the second the state of the device 20. The store 1 may thus be regarded as divided in a number of groups of positions, each group containing two positions in this example though the number may be higher. The first address, labeled "0, 0" has, however, no other address associated with it.

Other parts of the circuit which have not been noted in detail will be described hereinafter. A consideration of the operation of the device will clarify the relationship of various elements and their functions. The operation of learning will first be described.

In order that the device may be taught to associate a particular input pattern with a desired output code, inputs are applied to the terminals 4, 7 and 8. The pattern is applied in parallel to terminals 4 in the form of a binary pattern while the desired output is applied in parallel to terminals 7 as a binary code. Clearly, the device is in no way limited to a four-bit code as illustrated, and indeed many more bits will in fact be used. A signal voltage applied to terminal 8 is called the instruction to learn, as, unless it is inhibited in the gate 23, it enables the gates 10 and 12 thus permitting each input representing a binary "1" to be recorded in the address of sections 1*a* and 1*c* of the store 1 selected by the address selector 2. For the first pattern to be learned, the store 1 is empty, a "1" is present in the counter 3, and the address selector 2 selects address "0,0." There is no output from section 1*c* of the store therefore the output code signals applied to the terminals 7 are recorded, and therefore no output is produced from the gate 9. There is no number stored in the store 31, and a comparison with the output code in equality gates 24 results in one or more of the gates 24 not producing an output. Therefore, gate 25 being of threshold "4" does not operate and no output can be present from the gate 22, as it can receive no input either from the gate 9, or the gate 25. Consequently, no inhibition appears on the gate 23 and the pattern will be recorded in section 1*a* of the store while the associated output code is recorded in section 1*c*. As up to this moment no output was produced by gate 9, no signal passes through gates 13 and 14 to transmit the output of the counter 3 through the gates 15 and thus no count number is written in section 1*b* of the store. While the sections 1*a* and 1*c* are in the process of being recorded the writing of the count number in the store 16 is prevented by a short delay 49 inserted between gates 9 and 13. When the pattern is recorded in section 1*a* of the store, a comparison takes place in the equality gates 17 which results in a maximum possible score, four in the case illustrated, between the respective bits of the input pattern, and the same pattern after recording. The adder 44 gives in the present embodiment an analogue output corresponding to the number of output signals from the gates 17 which is applied to the differencer 19, and the stores 18 and 27. The store 18 is initially set to half value because of the signal from the reversal element 40 but a signal from the gate 9 passes through the gate 42, there being no output from the gate 26 since the store 16 is empty, and through the delay 50 to inhibit the gate 48, and therefore the differencer 19 shows a rise, the combined delay in the operation of the store 18 and the differencer 19 being greater than the delay 50, with the result that the differencer 19 is inhibited from setting the two-state device 20 to its "1" state. Hence the address selector 2 continues to select address wire "0,0" in store 1. The store 27 is initially set by the output of the element 40 to half value and is now set to full score from adder 44. The rise detector 28 defects a rise in the value stored in 27 and consequently produces a pulse which allows the signals on the appropriate ones of gates 29 from section 1*c* of the store 1 to be recorded in store 31. A comparison now takes place between the input 7 and the output code from the store 31 in gates 24. As the codes are identical the "four" gate 25 produces a signal inhibiting gate 14. From the delay 49 an output is produced to gate 13, but is inhibited in gate 14. Moreover, a signal is applied to terminal 47 whenever one is applied to terminal 8, so the store 31 continues to store the first output code. The normal functioning of the circuit associated with terminal 47 is more appropriate to the recognition process and will be described hereinafter.

A new set of input information is now presented at the terminals 4 and 7, and it is immediately compared with the information stored. The new pattern is compared in equality gates 17 with the pattern recorded in address "0,0." Whether at this stage the output from adder 44 is greater or less than half score as a result of this comparison does not matter as the "1" output of the differencer 19 is still inhibited by gate 38 because nothing is recorded in section 1*b* of store 1, while an output is coming from gate 9. A comparison also takes place between the output of store 31 which stores the first output code and the new output code presented at terminals 7.

As there will be a lack of identity between the two codes there will be no output from gate 25. The inhibition is removed from gate 14 and after a delay in the element 49 an ouput signal from the gate 9 allows the counter 3 to write in section 1*b* of the store, a number 1 the initial state of the counter 3 being 1. Now that section 1*b* is occupied the cycle of operations which follows will differ slightly from the previous cycle described. A comparison with the first pattern stored takes place in the gates 17 and the adder 44 gives an output on conductor 45 to the two stores 18 and 27 and to the differencer 19. As the previous position of the two stores was at half value due to the operation of element 40, a score of less than half from adder 44 will result in the device 20 remaining in its "0" state; a score of half from 44 also produces no alteration in the device 20, while an increase in score results in 20 being set to its "1" state. While this operation is taking place the output from section 1*b* of the store 1 passes through delays 37 to the store 21, the output of which will set the address selector 2 to select one address wire of the pair "1,0" and "1,1" the actual wire of the pair being chosen as a result of the state of the two-state device 20. If the new pattern resembles the first pattern in that more than half the digits agree, then it will be stored at address position "1,1," if half or less than half of the digits agree, then it will be stored at address position "1,0." The differencer 19 is not inhibited from setting up a "1" in device 20 because the output from section 1*b* of store 1 inhibits gate 42 and prevents a signal from gate 9 reaching gate 38 or the inhibit connection of gate 48. As soon as the address selector 2 selects address "1,0" or "1,1," no output will be present from any store section of store 1, the counter 3 will now contain a binary "2" the gate 1*b* having been opened by the signal from 14 which opened gates 15 permitting the instruction to learn signal to pass through delay 39 to advance the counter 3 to "2." The store 31 will contain an output code and a different address wire is being considered. The pattern will therefore be recorded in section 1*a* and the associated code in section 1*c*. Now there is no output from the section 1*b* of the store 1, the stores 18 and 27 are reset, and the address selector 2 is constrained to select address "0,0" again. Thus the device continues to cycle as above until a further set of information is applied to terminals 4 and 7. Clearly the same information cannot be re-recorded as the output fram gate 25 inhibits gate 23 via gate 16 to close gates 10 and 12 of a third pattern and an associated output code is now applied to terminals 4 and 7, respectively, the pattern is immediately compared with the first pattern stored. For the sake of example let it be assumed that more than half the bits in these patterns correspond. A rise is recorded in the stores 27 and 18, the differencer 19 switches the two stable device 20 to its "1" state, and the "1" recorded in section 1*b* of the store 1 together with the output of device 20, cause the address selector to select the recorded address position "1,1." The rise in store 27 will have coincidence detector 28 to produce an output enabling gates 29, and therefore the output code associated with the first pattern is recorded in store 31. Although the equality gates 24 do not produce a maximum output to operate gate 25, the gate 13 is inhibited by the "1" recorded in section 1*b* of store 1, and therefore gates 15 and 16 remain closed. Upon the selection of address "1,1" the third pattern is compared with the second recorded pattern. Let it be supposed that on this occasion less than half the bit of the third pattern correspond to respective bits in the second pattern. Nothing is recorded in the store 27 as the previous output of the adder 44 was larger. The new score is recorded in store 18, and the differencer 19 selects the "0" state of two state device 20. However, there is now no output from section 1*b* of the store 1 while there is an output from sections 1*a* and 1*c*. Thus with the first output code recorded in store 31 and no inhibition on gate 13, the output from gate 9 is free to open gates 15 and 16 to advance the counter 3 to binary "3" and to permit the recording of a binary "2" is section 1*b* of store 1 on the address "1,1." Meanwhile, the lack of an output from section 1*b* has had three other effects, which are now implemented. The reversal element producing a signal on conductor 41, delayed by element 51 causes stores 18 and 27 to be reset to half value, and the lack of inhibition on gate 42 permits a signal from gate 9 to pass via the delay 50 and nullify the effect of the decision in differencer 19. Thirdly, the delays 37 are over, and so the address selector 2 is caused to select address "0,0" again. Once more a comparison takes place between the first stored pattern and the third pattern, and once again there is a rise in the stores 18 and 27. Address "1,1" is again selected, but now an address "2" is recorded in section 1*b* of the store 1. Clearly, the differencer is now free to operate and switch device 20 to its "0" state, and consequently after the delays 37 are over address position "2,0," an entirely vacant address is selected. During the last comparison, no new score will have been inserted in the store 27, so store 31 still contains the first output code. A comparison between the first and third output codes fails to produce maximum equality from gates 24, and no output can be produced by gate 9, so the inhibition is removed from gate 23 and the third pattern together with the third output code are respectively recorded in sections 1*a* and 1*c* of the store 1. As section 1*b* of the store is not filled, after delays 37 and 50 the address selector 2 selects address "0,0" again. A difference arises however in that the comparison in gates 17 between the third pattern on terminals 4, and that pattern from section 1*a* of the store 1 will have produced a maximum possible output from adder 44. This causes store 27 to record a maximum score, rise detector 28 to secure a rise and the third output code to be recorded in store 31. As this output code is compared with the same code applied to terminals 7, gate 25 will operate to inhibit gate 23 via gate 22, and gate 14 directly. In this case the inhibition of gate 23 is not significant as it is already inhibited due to the direct output from gate 9. However, the ihibition of gate 14 is important, as this prevents the recording of a binary "3" in section 1*b* of store 1, and the advance of counter 3 to binary "4." Stores 18 and 27 are now reset to half value and address selector 2 selects address "0,0." Thus once again this device will cycle until the information on terminals 4 and 7 are changed. As further operation of the device will now be clear from the foregoing description with reference to FIGURES 1*a* and 1*b* of the drawings, no subsequent activities will be described.

The device is arranged so that a pattern will be automatically compared with all the previously recorded patterns to which it bears a particular relationship so that a family tree of patterns will result in the store. A necessary result of this arrangement is that address position "0,1" is not used and therefore is not provided. Whether the second pattern stores is more than half like the first pattern or not, it will be stored in one of the two positions of address "1." Subsequently all that addresses may be used so must be able to be selected by the address selector 2.

The operation of the date sorting device during the recognition of an unknown pattern applied to the input terminals 4 will now be considered. At the time when the last pattern was recorded with its associated output code, no output was present from the sections 1*b* of the main store, and consequently the address selector 2 will select address "0,0." Thus, when the new unknown pattern is applied to the terminals 4, a comparison is at once made with the pattern stored in address position "0,0" of section 1*a*. As there is no signal from gate 26 the element produces a signal which causes the stores 18 and 27 to be set to half value, the unknown pattern is next compared with the pattern stored in address "1,0" or "1,1" of the store 1 depending on the result of the comparison with the pattern in address "0,0." If more than half the digits of the unknown pattern correspond to equivalent digits of the pattern stored in address "0,0" of section 1*a*, then the differencer 19 will set the two-state device 20 to a "1" and the output from section 1*b* of the store 1 at address "0,0" produces a "1" to the store 21. The address selector 2 is therefore set to "1,1." Meanwhile, the increase over half score is recorded in store 27, and sensed in the rise detector 28, allowing the output code associated with the pattern stored in address position "0,0" to be recorded in store 31. Comparison is now made with the number stored in address "1,1" and, if a rise is indicated above the level recorded in store 27, a new output code associated with that pattern replaces the first code stored in 31. The cycle of operations will continue regardless of whether a maximum possible score is attained until comparison is made with a pattern on an address wire for which there is no address stored in section 1*b*. When this occurs there will be no output from the gate 26, the inhibition will be removed from gate 42, and after the delay 51 has permitted a sufficient time for a comparison to be made between the last score recorded in store 18, and the maximum score recorded in store 27 with the output from the adder 44, the stores 18 and 27 will be set to half value. The element 51 will have a delay equal to that of the delays 37 and 50 and so the address selector 2 will then be energised to select address wire "0,0." The delay 36 must be sufficiently long to permit the recording in store 31 of the output code associated with the final pattern with which comparison is made, as it is possible that this pattern produces the maximum score.

Clearly, during the process of recognition if the input information applied to terminals 4 changes while a search is being made the possibility arises of a momentary erroneous match being recorded. Therefore, a device which, to avoid undue complication in the drawing is not illustrated, is provided responsive to the change of state of any bit applied to the input terminals 4. This device will produce an output whenever one of the input bits changes its state and its output is connected to terminal 47 setting the bistable 30 into its "1" state and inhibiting the gate 34 from passing a signal out on terminal 6 to accept the data presented at terminals 5 or to clear the store 31 by way of the delay 43. The delay 36 must be long enough to allow recording in store 31 of the output code associated with the last pattern with which comparison is made. The delay 35 will be longer than the delay 36 so that if there has been a signal applied to terminal 47 and the recognition is doubtful in consequence, a further complete cycle must be made before the information in store 31 can be accepted. The delay 43 will merely be sufficiently long to allow readout from terminals 6 to be completed before the store 31 is cleared.

When the unknown input applied to terminals 4 is unchanged, after a delay 36 as hereinbefore described, an output will become available at terminal 6. This output is used to indicate that the information in the store 31 and presented at terminals 6 is to be accepted. After a short delay 43 the store is cleared. If desired, a threshold level may be set on the rise detector 28 to ensure that unless a predetermined level of similarity between the unknown input pattern and one of the stored patterns is achieved, no output appears at the terminal 6.

For certain specific purposes it may be advantageous to utilise a drum store in preference to a matrix store. Most especially a drum store is desirable when a relatively few words each containing many bits are required to be stored. For example, if 100 words each of 1,000 bits are used and the input information is available in serial form such as may, for example, come from a television camera, if a matrix store is used, 1,000 gates such as 10 and 17 will be required if 1,000 bits are to be stored, and the information must be converted to parallel form. This is clearly an expensive arrangement and thus for particular applications the serial nature of a drum store may be advantageous. This circumstance will only arise when it is actually desired to store words having many bits and a device such as hereinafter described which utilises a matrix store may be preceded by data handling equipment capable of converting many bits of serial input information into many fewer parallel bits indicating combinations of bits of basic information. To take an example a very large number of bits may be serially available each bit indicating the value of a particular pattern point in a pattern to be recognised. Many of these bits can be combined in different combinations to produce many fewer bits indicating the presence or absence of pattern features. Such equipment may conveniently comprise integrators and may take a form known to one skilled in the art.

A number of modifications may be made to the basic device for particular applications. FIGURE 4 shows a modification which increases the reliability of the device on recognition by increasing its tolerance for distortion of input information. This is achieved in principle by preventing a decision being made on recognition to go to an unoccupied store address position when an alternative occupied address position exists. For example, a character may have proceeded to an address position where the next address indicated is say 10. If 10,1 is occupied and 10,0 is unoccupied then a comparison which indicates less than half the bits of the unknown pattern correspond to those of the stored pattern, and consequently would cause a search to be made of the unoccupied 10,0 position is unnecessary. Moreover, in certain particular circumstances it may also be disadvantageous. This will occur when the decision as to whether the character to be recognised is more or less like the last character with which it is being compared is a border line case. Moreover, to carry on the example the address position 10,1 may not only be occupied but may also lead to further address positions so the unnecessary decision to accept address 10,0 may have effectively prevented comparisons with many more stored patterns. The means by which this modification is accomplished is as follows. The reference numerals which are duplicated in FIGURES 1*a* and 1*b* and FIGURE 4 refer to the same components. In the address section **1*b* of the main store 1 two extra bits are provided for each address position, the purpose of these bits being to indicate which of the two of a pair of addresses the common reference of which is stored in section 1*b* is occupied or if neither or both are occupied. It will be seen from the previous description of the functioning of the device that if neither of the subsequent address pair is occupied then no address information will be recorded and that fact will cause the resetting of stores 18 and 27 by the operation of the reversal element 40 via the delay 51. If so desired, therefore, this circuitry may be replaced by circuitry responsive to the additional bits in the address section of the store. As such an arrangement will be readily conceived by one skilled in the art it is not incorporated in FIGURE 4. The conductors carrying the two extra bits of information bear the reference numerals 81 and 82 and are applied individually to the respective "2" gates 88 and 89 and together to the "2" gate 83. During recognition if there is a signal present on both conductor 81 and conductor 82 this indicates that both subsequent store positions are occupied and means that the device must make its search decision by the normal operation of the bistable 20, although as will be seen the two state device 20 is now not directly connected to the address selector 2. This result is achieved by causing the output of the gate 83 to enable a "2" gate 84 and to inhibit gate 85. If, therefore, the device 20 is in the normal course of events set to its "1" state then another input will be applied to the gate 84 which will pass through the gates 86, 99 and 100 and will be applied by means of the conductor 87 to the address selector 2 causing the next subsequent address position called for convenience N.1, to be selected. If the bistable 20 is set to its "0" state then no signal is available on conductor 87 and the address selected will automatically select the address position N.0. Continuing with the recognition process, if conductors 81 and 82 carry no signal then no output will be available to the "1" gate 86 and as hereinbefore described the device will function normally to return to the store position 0,0. If, however, there is an output on conductor 81 and not on conductor 82 this indicates that the address position N.1 is occupied but the address position N.0 is not occupied. It is therefore desirable that the next comparison will take place at the address position N.1 whatever the result of the comparison shown in the bistable 20. This automatically results because the gate 83 can produce no output to inhibit the gate 85 and therefore the signal on conductor 81 will pass through gate 85 and gates 86, 99 and 100 to conductor 87, causing the address selector to select N.1. If there is a signal on conductor 82 and not on conductor 81 then the "2" gate 83 is not enabled and therefore no signal can be provided on conductor 87 and the address selector 2** will select address position N.0 automatically.

For this device to operate as described the two extra bits in section **1*b* of the store 1 must be recorded during the learning cycle. Clearly, it is not desirable to record either of these bits when they are already recorded. This result is achieved by either of gates 88 or 89 producing an output through the gate 90 inhibiting both gates 91 and 92. Similarly, it is not desirable to record while the address selector 2 is changing its state so an output is taken on conductor 93 to a device 94 which produces an output when bits in the address selector 2 are changing. This output passes through a short delay 95 to the gate 90 and once again inhibits recording. A further circumstance which arises is that it is not desirable to record when a match has been reached between the output information available at terminals 5 and the input code applied to terminals 7. This is achieved by taking the conductor 96 from the output of gate 25. Finally, recording must not take place when there is no instruction to learn signal applied to terminal 8, two gates 97 and 98 being provided for this purpose. If none of these circumstances arise however it will be seen that the state of the device 20 is automatically recorded by signals which pass either through gates 91 or 92. The circuit comprising elements 83 to 86 must not operate when the device is learning, and is prevented from so doing by inhibiting the output of gate 86 during learning by the instruction to learn signal on terminal 8 being applied to inhibit gate 99. The state of the two state device 20 is transmitted to the address selector 2 by enabling a "two" gate 101 with the signal on terminal 8, and applying the output of gate 101 through gate 100 of threshold "one" to the address selector 2 by way of conductor 87**.

For certain practical applications where a large number of patterns are stored it may be advantageous to reduce searching time on the recognition cycle by accepting a pattern giving a maximum score immediately it occurs. This will result in patterns which occur most frequently being recognised more rapidly as they will of necessity be stored nearer to the 0,0 address origin in the store.

During the recognition cycle it is possible that two patterns will produce the same score. FIGURE 2 illustrates a means of refusing to accept an output under such circumstances, as otherwise the first output code would be accepted, which might not be correct. The circuit components which are common to FIGURES 1*a* and 1*b* and FIGURE 2 bear the same reference numerals. An equality gate 53 compares the output of the maximum score store 27 with its input. If equality is sensed an output from gate 53 is applied to the two-state element 59 and to the inhibit gate 58. If there has previously been a rise sensed by detector 28 the two-state element 59 will have been set to its "0" state and an output will be produced through the delay 60 inhibiting the output of gate 58. Thus a transient equality will not cause a signal to be passed through gate 58 as the delay 60 will maintain the signal on gate 58 for a sufficient time to prevent this. If the equality, however, is of any considerable duration, the output of gate 53 will pass through gate 58, setting the two-state element 61 to its "1" state. Unless a subsequent rise is sensed during the particular cycle involved, element 61 will not be reset to its "0" state, and therefore a signal will be passed to terminal 47 inhibiting the acceptance signal of the device illustrated in FIGURE 1 as hereinbefore described.

In order to prevent re-recording during the learning process of two identical input patterns which are associated with different output codes, such as might occur if a pattern from which the input data is produced is very mutilated, a full score detector 54 is available to set a two-state device 55 to its "1" state, thus inhibiting gate 56 which is placed in series with input terminal 8, the instruction to learn signal being applied to terminal 57. The device 55 is reset by a signal on conductor 32.

The basic embodiment of the device described is capable of being utilised in a great number of different ways, which will be apparent to one skilled in the art. In the interest of brevity it is proposed only to describe four arrangements by way of illustration of the application of the invention. The first is to apply the pattern and the desired response as already described, with the elements which must respond to the output signals connected to the terminals 5. In this way the teacher has control of those elements via the device and can consider that any operations of the output elements in response to his commands as an indication that the device has noted the circumstances which call for the said response. The device should repeat these responses in the appropriate ways after the teacher has gone.

Secondly, by means of a binary store the last response could be presented alongside the new pattern to be recognised in those cases where a chronological sequence is required. A device that learns under these conditions could take over from a man at any time in a process, and complete it in the absence of the man, provided that a given response, followed by the same external data were never required to produce different subsequent responses. If it were, then the binary store would have to be increased so that several past responses could be stored.

Thirdly, several devices as shown in FIGURES 1*a* and 1*b* may be cascaded, the output at the terminals 5 of each but the last being the input of the next, part of the output being stored for one search cycle of the first device so that two sets of output information which are separated in time may be together associated with a single input code in the next device. In this arrangement each unit could give half the number of bits in the output code that it accepted in the input pattern. By this means the process of character recognition could take place by supplying the first device with patterns representing character features, a subsequent device could look for those features in combination, while a further device could further combine the features from the second device to produce an output code indicative of the character as a whole.

An alternative method of achieving a similar result is illustrated in FIGURE 3, whereby a single device has its output recirculated to its input. The block numbered F1 represents the device as illustrated in FIGURES 1*a* and 1*b*. Reference numerals which appear both in this figure and in FIGURES 1*a* and 1*b* refer to the same components.

A counter 62 is arranged to be advanced by a signal on conductor 33. This will occur whenever writing takes place on sections **1*a* or 1*c*** of the main store in FIGURES 1*a* and 1*b*, during the learning cycle. The counter 62 feeds a recorder 63 in which any desired code may be produced. For example, a code in which the presence or absence of each bit indicates the presence or absence of a feature or a group of features may be employed. If desired the recoder 63 may be omitted. In this case the number from counter 62 forms the code. If a particular arrangement of bits from the recoder represents a particular combination of features or groups of features, then the intermediate store 64, in which the output of recoder 63 will provide a part of the stored information, will now need to be cleared after each cycle of operations. As shown in FIGURE 3, however, store 64 is arranged to be cleared by a signal on the conductor 75 at the end of every cycle. The input to F1 is provided partly by the normal pattern applied to terminals 4, which represents a feature of a character and partly by the output from store 64 which represents previous features and is applied to terminals 78. Terminals 78 would in all respects other than that of the input applied correspond to terminals 4, and would be permitted access to section **1*a* of the main store 1** in FIGURES 1*a* and 1*b* under the same circumstances. Therefore the input to the basic unit would comprise partly new information, and partly past responses from previous inputs. This part response could be the last response only, or all the past responses during a given period.

In operation, a pattern to be learned is applied to terminals 4, and an instruction to learn signal to terminal 80. A pulse from the beginning element 69 is applied to two-state devices 65 and 66. Device 65 is switched to its "1" state, and produces an output to the "two" gates 67. Device 66 is switched to its "0" state, and the signal inhibiting gate 71 is removed. The number present in recoder 63 is allowed to pass through "two" gates 67 and thus to terminals 7 where it forms an associated intermediate code signal, indicating the presence of a certain feature or group of features in the input. If the signal on terminal 80 is now removed, an output from the end element 70 will pass through delay 72 and will be applied to terminal 8 permitting the input and the intermediate code to be recorded. The intermediate code will now be passed to store 64, and a signal on conductor 33 will reset device 66, advancing counter 62 and, by the action of device 66, inhibiting gate 71. The signal to accept the output is used to set the two-state device 65 into its "0" state, and thus to prevent the code in recoder 63 passing gates 67. The desired response for the group of features or the complete character may now be applied to terminals 79, and will be associated with the particular pattern together with the record of past features applied to terminals 77 and 4. This process will continue with subsequent input information until an output from a selected one of the output terminals 5 indicates that a complete output code as distinct from an intermediate code is available. This distinction is implemented by the operation of gates 73 and 74. The intermediate store which would otherwise record the final output code is cleared by the same signal which is applied to gates 73 and 74.

The opening of gates 74 will allow the final output code to be applied to terminals 76, while the signal to accept this code will be passed through gate 73 to terminal 77.

Clearly, the basic device hereinbefore described is by way of an example only of an arrangement in accordance with the present invention. No necessity arises to restrict the input or output information to binary coded form, and arrangements utilising analogue storage means and analogue inputs will be apparent to one skilled in the art.

What I claim is:

1. A data sorting device comprising a store, first input means for a multi-element information signal, second input means for an associated response signal, means for selecting an address in said store, said selecting means including means for selecting a group of addresses and further means for selecting an address within the groups, said store being divided into three parts, a first part for multi-element information signals, a second part for associated response signals and a third part for selection signals, means for transferring signals from said third part of said store to said selecting means to select a group of addresses, means for comparing a multi-element information signal derived from the first part of said store with an input multi-element information signal and for controlling the further means for selecting the address within the groups whereby an input multi-element information signal is compared with a sequence of stored multi-element information signals.

2. A data sorting device comprising:

(1) a store including a plurality of groups of storage portions, (2) first input means for a multi-element information signal, (3) second input means for an associated response signal, (4) means for recording a first information signal and a first associated response signal in an indicated storage position in said store, (5) group selecting means for selecting a group of position in said store in one of which a subsequent information signal and its associated response signal may be recorded, (6) means for storing an indication of such group in association with said first signal and for adjusting said group selecting means to select the next group of positions, (7) comparison means for determining the number of correspondences between the elements of said first information signal and the respective elements of a further information signal subsequently applied to said first input means, (8) means responsive to the number of correspondences for selecting one of the group of positions indicated in association with said first information signal, (9) means responsive to the presence of an information signal and its associated response in the selected position of the group for initiating a further comparison by said comparison means between the information signal in the selected position of the group and said further information signal, and

(10) means responsive to an absence of an information signal and its associated response in said indicated position for (a) recording in the indicated position said further information signal, (b) for storing in association with said further information signal an indication of the group of signals selected by said group selecting means, and (c) for adjusting the group selecting means to select the next group of positions.

3. A data sorting or recognition means comprising input means for an information signal to be sorted or recognised, a store for recording information signals, means for recording with each information signal in the store, a group selecting signal indicating a group of store positions and comparison means for selecting one of a group of positions indicated by a group selecting signal, said comparison means being arranged to compare a signal applied to said input means and the information signal with which said group selecting signal is recorded and to make the selection in dependence upon the degree of comparison.

4. A data sorting device in accordance with claim 1 adapted for digitally coded multi-element information signals and wherein said means for selecting the address within the groups is responsive to the number of correlations between the elements of said input information signal and the respective elements of said information signal derived from the first part of the store.

5. A data sorting device in accordance with claim 4 wherein two addresses are provided in each group of addresses and wherein said means for controlling the further means for selecting the address within the groups is constrained to cause said selecting means to select one address if more than half the elements of said input information signal correspond to the respective elements of a first information signal derived from the first part of the store and to select the other address if half or less than half the elements correspond.

6. A data sorting device in accordance with claim 5 wherein said means for controlling said further means for selecting one of two addresses in each group of addresses is responsive to means for storing the results of each comparison in said comparison means, differencing means being provided to constrain the first said means to control said selecting means for each subsequent comparison after the first comparison to select one address if a subsequent comparison exceeds a previous comparison, and to select the other address if a subsequent comparison fails to exceed a previous comparison.

7. A data sorting device in accordance with claim 6 wherein said means for controlling said further selecting means produces signals indicative of which address within a group has been selected, and interconnecting means are provided for recording said indicative signals in the third part of said store.

8. A data sorting device in accordance with claim 4 wherein said first input means and said second input means comprise a plurality of input terminals one terminal for each element of each respective signal, said input signals being applied in parallel to said input means.

9. A data sorting device in accordance with claim 1 wherein said associated response signals are multi-element signals, means being provided for comparing said associated response signal with stored associated response signals to determine the number of correspondences between respective elements, said means being responsive to total correspondence between all the compared elements to produce a signal inhibiting said store from recording the input information signal associated with the associated response input signal provided that said means for comparing said input information signal with said recorded information signal produces an output indication of a maximum number of correlations between the elements of said information signals.

10. A data sorting device in accordance with claim 1 wherein said store comprises a matrix store.

11. A data sorting device according to claim 10 wherein said store comprises a thin magnetic film store.

12. A pattern recognition device comprising a data sorting device in accordance with claim 1 wherein a pattern to be recognised is applied in the form of a multi-element information signal to said first input means and compared in said comparison means with a succession of stored information signals derived from the first part of said store, said selecting means successively selecting addresses in said store in response to selection signals recorded in the third part of said store and to said comparison means, second storage means to record the maximum number of correspondences sensed by said comparison means, third storage means responsive to said second storage means connected to the second part of said first mentioned store to record the response signal from the second part of said store associated with the input signal producing the maximum number of correlation, and output means to derive said response signal from said third storage means.

13. A pattern recognition device comprising a data sorting device in accordance with claim 12 wherein means are provided to record the output response of the data sorting device said means producing the output response to connecting means applying said output response as part of a subsequent input information signal to said data sorting device.

14. A pattern recognition device comprising:

a plurality of devices according to claim 3, each storing at positions in the store thereof output data and each including output means for applying to output terminals output data stored at one of said selected positions in the store, connecting means, connected from the output terminals of one of said plurality of devices to the input means of another of said plurality of devices, and delay means connected from the output terminals of said another of said plurality of devices to the input means for said another of said devices, whereby the input information signal for said another of said devices is constituted partly by output data from the one of said devices and partly by previous output data from said another of said devices.

No references cited.

ROBERT C. BAILEY, *Primary Examiner.*

R. B. ZACHE, *Assistant Examiner.*